(12) United States Patent
Strand

(10) Patent No.: US 6,970,578 B1
(45) Date of Patent: Nov. 29, 2005

(54) METHOD OF GENERATING IMAGES TO AID IN THE DETECTION OF MANMADE OBJECTS IN CLUTTERED UNDERWATER ENVIRONMENTS

(75) Inventor: Michael P. Strand, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 667 days.

(21) Appl. No.: 10/196,392

(22) Filed: Jul. 16, 2002

(51) Int. Cl.[7] .......................... G06K 9/00; G06K 9/20; G06K 9/36; H04N 7/18
(52) U.S. Cl. .................. 382/103; 382/283; 348/81
(58) Field of Search ................ 382/103, 283; 348/81; 701/21, 28

(56) References Cited

U.S. PATENT DOCUMENTS

| | | | |
|---|---|---|---|
| 5,231,401 A * | 7/1993 | Kaman et al. ............ | 342/55 |
| 5,243,541 A * | 9/1993 | Ulich ...................... | 348/81 |
| 5,831,724 A * | 11/1998 | Cordes ................... | 356/141.1 |
| 5,929,453 A * | 7/1999 | Andrews et al. ........ | 250/461.1 |
| 6,348,942 B1 * | 2/2002 | Watkins .................. | 348/81 |
| 6,836,285 B1 * | 12/2004 | Lubard et al. ........... | 348/31 |
| 2004/0027919 A1 * | 2/2004 | Erikson .................. | 367/88 |

OTHER PUBLICATIONS

Strand, M.P.; Coles, B.W.; Nevis, A.J.; Regan, R., "Laser Line Scan Fluorescence and Multi-spectral Imaging of Coral Reef Environments," Feb. 1997, Proceedings of SPIE, vol. 2963, pp. 790-795.*

Nevis, A., "Adaptive Background Equalization and Image Processing Applications for Laser Line Scan Data," Apr. 1999, Proceedings of SPIE, SPIE, vol. 3710, pp. 1260-1271.*

Sitter, Jr., D.; Gelbart, A., "Laser-induced Fluorescence Imaging of the Ocean Bottom," Aug. , 2001, Optical Engineering, SPIE, vol. 40, Issue 8, pp. 1545-1553.*

* cited by examiner

*Primary Examiner*—Jingge Wu
(74) *Attorney, Agent, or Firm*—James T. Shepherd

(57) ABSTRACT

An underwater image area is illuminated with light generating elastic scattering from manmade objects and naturally-occurring features, and fluorescence from naturally-occurring features. Local standard deviation (LSD) images are formed using the elastic scattered and fluorescent light. Elements of each LSD image are compared to threshold criteria to generate: i) first binary images having first image state portions indicating manmade objects and naturally-occurring features, and ii) second image state portions indicating background. The first binary images are logically combined generating a composite image mask. Statistical threshold criteria for each fluorescence-based image is generated using only portions identified by portions of the composite image mask indicating of background. Elements of each fluorescence-based image are compared to statistical threshold criteria to generate second binary images. At least two second binary images are logically combined to generate a binary manmade object image mask delineates between manmade objects and everything else.

17 Claims, 2 Drawing Sheets

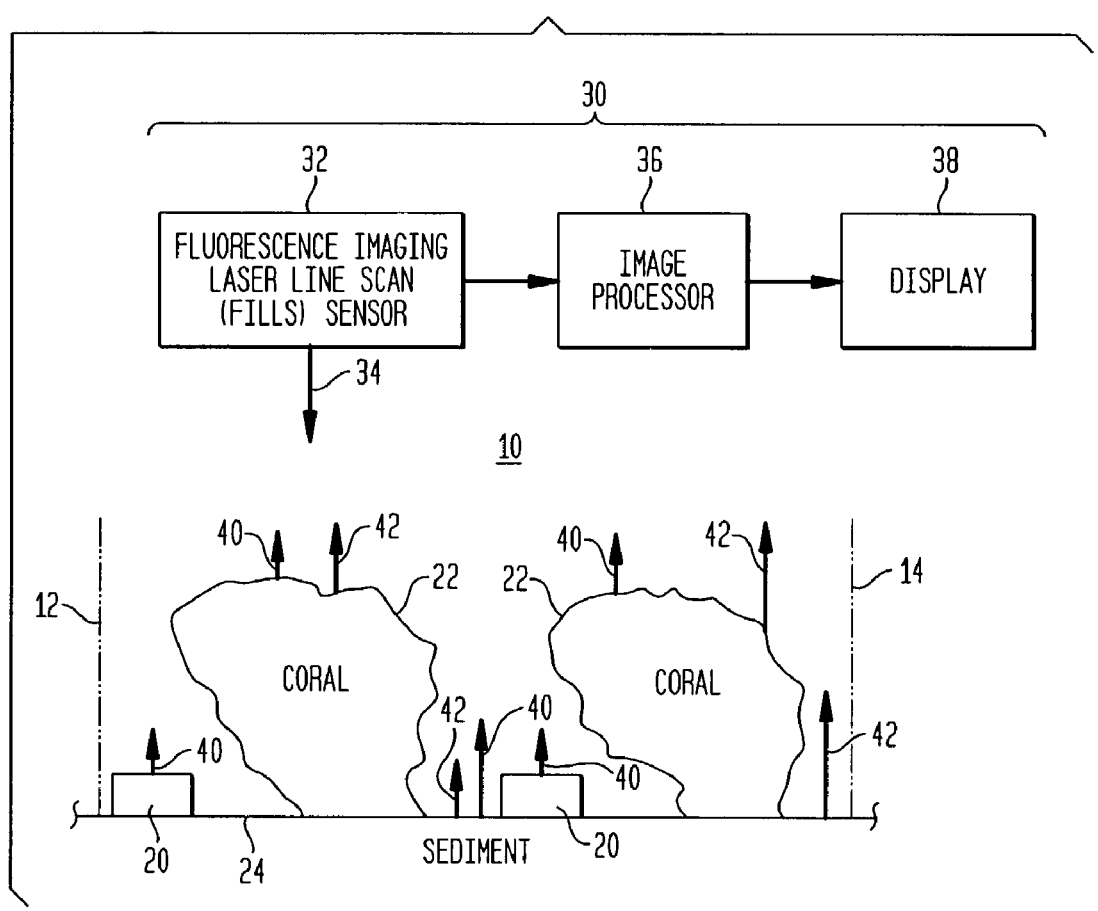

METHOD OF GENERATING IMAGES TO AID IN THE DETECTION OF MANMADE OBJECTS IN CLUTTERED UNDERWATER ENVIRONMENTS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to underwater detection schemes, and more particularly to a fluorescence imagery-based method of generating images that can be used to aid in the detection of manmade objects in cluttered underwater environments.

BACKGROUND OF THE INVENTION

Mine hunting is traditionally performed by a combination of acoustic methods (i.e., sonar) and optical methods. Traditionally, detection and classification of mine-like contacts are performed by acoustical methods. During such operations, "contacts" are classified as "mine-like" only if they are sufficiently similar to known signatures of mines. Many of the sonar contacts classified as "mine-like" will, in fact, be "false alarms". That is, they will be objects that are not mines. This is especially true in highly cluttered areas. A coral reef is an area where acoustical methods are expected to generate many false alarms. This is due to the massive amounts of "biological clutter" in the scene.

Detection/classification is traditionally followed by an identification step, where each "mine-like contact" is evaluated to determine if it is or is not a mine. Typically, the identification process is carried out by optical methods. A variety of optical methods may be employed, ranging from divers who visually identify the contacts, to remotely operated vehicles equipped with video cameras, to towed bodies or autonomous vehicles equipped with more sophisticated Laser Line Scan, Streak Tube Imaging Lidar (STIL), or other lidar sensors. If the density of "mine-like contacts" to be identified is low, identification can be manually performed by a trained human observer on an image-by-image basis. However, in a coral reef (or other highly cluttered environment) where the density of "mine-like contacts" is high, this process is very time consuming and tiring. It is highly desirable to develop an automated method that will locate the manmade objects in an image, while rejecting the coral reef (or other clutter) in the image. Then the human observer will be cued to focus his attention on only the manmade objects in the scene for identification as mines or non-mines.

SUMMARY OF THE INVENTION

Accordingly, it is an object of the present invention to provide a method of generating an image of manmade objects residing in an underwater environment.

Another object of the present invention is to provide an optical method of generating an image of manmade objects residing in highly cluttered underwater environments.

Still another object of the present invention is to provide a method of generating an image of manmade objects residing in an underwater environment having coral reefs.

Yet another object of the present invention is to provide a method of generating an image of an underwater environment where the image simplifies the detection of manmade objects by excluding clutter.

A still further object of the present invention is to provide a method of generating isolated images of manmade objects in cluttered underwater environments where the images of the manmade objects are isolated from images of naturally-occurring clutter.

Other objects and advantages of the present invention will become more obvious hereinafter in the specification and drawings.

In accordance with the present invention, a method of generating an isolated image of manmade objects residing in an underwater environment starts with illumination of an image area underwater with light of a wavelength selected to generate elastic scattering of the light when incident on manmade objects and naturally-occurring environmental features. The wavelength is further selected to generate fluorescence when the light is incident on naturally-occurring environmental features, but not when the light is incident on manmade objects. The elastic scattering of the light from the image area is sensed and used to form an image. Likewise, light indicative of fluorescence is sensed and used to form a fluorescence-based image at each of a plurality of fluorescence wavelengths such that a plurality of fluorescence-based images are generated. A local standard deviation (LSD) image of the image area is formed/computed based on each of the elastic scattered light image and each of the fluorescence-based images such that a plurality of LSD images are generated. Each element of each LSD image is compared to a threshold criteria to generate a corresponding plurality of first binary images. Portions of each first binary image at a first image state are indicative of the manmade objects and the naturally-occurring environmental features, whereas portions of each first binary image at a second image state are indicative of background in the image area that is neither the manmade objects or the naturally-occurring environmental features. The first binary images are logically combined to generate a composite image mask where portions thereof indicative of the background in the image area have the same binary value. A statistical threshold criteria for each of the fluorescence-based images is generated using only portions thereof identified by the portions of the composite image mask indicative of the background in the image area. Next, each element of each fluorescence-based image is compared to the statistical threshold criteria corresponding thereto to generate a corresponding plurality of second binary images. Only portions of each second binary image at one of the two binary image states is indicative of the manmade objects. Finally, at least two of the second binary images are logically combined to generate a binary manmade object image mask. First portions of the binary manmade object image mask indicative of the manmade objects have the same binary value, while second portions of the manmade object image mask not indicative of the manmade objects have a different binary value than the first portions.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 2 is a block diagram of a system for carrying out the method of the present invention.

DETAILED DESCRIPTION OF THE INVENTION

Figure 1:
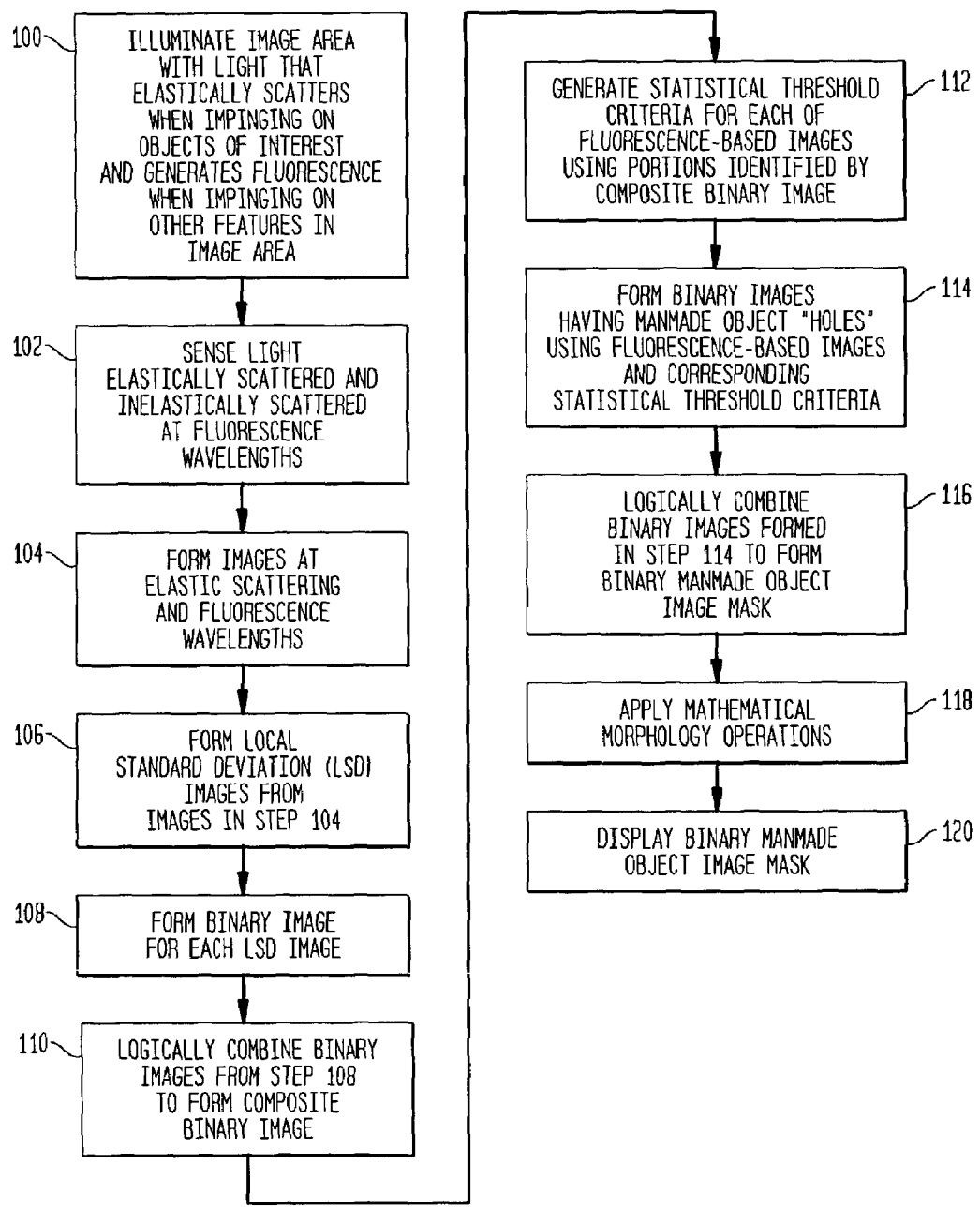
FIG. 1 is a flow diagram of the method of generating an isolated image of manmade objects residing in an underwater environment in accordance with the present invention.

Referring now to the drawings, simultaneous reference will be made to FIGS. 1 and 2 where FIG. 1 depicts the method of generating an isolated image of manmade objects residing in an underwater environment in the form of a flow diagram and FIG. 2 is a block diagram of a system 30 that can be used to carry out the method outlined in FIG. 1. By way of illustrative example, the present invention will be explained for use in an underwater environment containing coral reefs. However, it is to be understood that the present invention can be used in any underwater environment and is particularly well suited for use in cluttered underwater environments.

An underwater area 10 to be examined is illustrated as the area between dashed lines 12 and 14 in FIG. 2. Within image area 10 are a number of features to include manmade objects 20, coral 22 and the sediment 24 that comprises the sea floor. The goal of the present invention is to form an image of area 10 that isolates manmade objects 20 from all other features so that an observer of such an image can quickly, easily, and without training, see manmade objects 20 in area 10.

The first step or step 100 in the method of the present invention involves illuminating area 10 with light. In general, the light must be selected to generate elastic scattering (i.e., scattering with no change in photon energy) when impinging on man-made objects 20 and when impinging on other naturally-occurring features (e.g., coral 22 and sediment 24). Additionally, the light must be selected to generate inelastic scattering (i.e., scattering with a change in photon energy) when impinging on the naturally-occurring features (e.g., coral 22 and sediment 24) in image area 10, but not when impinging on most manmade objects 20. In the present invention, the inelastic scattering occurring at various fluorescence wavelengths is of interest.

To create this scenario, a fluorescence imaging laser line scan (FILLS) sensor 32 positioned over image area 10 scans laser light 34 thereacross. In terms of image area 10 containing coral 22, light 34 can be a 488 nanometer wavelength (i.e., blue) laser beam from an argon ion laser. Light 34 at this wavelength generates elastic scattering 40 when it impinges on manmade objects 20, coral 22 and sediment 24, and generates inelastic scattering 42 when it impinges on coral 22 and sediment 24. However, such inelastic scattering 42 will not be generated by most types of manmade objects 20.

FILLS sensor 32 is equipped to sense (at step 102) elastic scattering 40 (i.e., at the wavelength of light 34) and inelastic scattering 42 in one or more fluorescence wavelength bands. The number of fluorescence wavelengths used can be based on the types of features expected in image area 10, the wavelengths at which such features fluoresce, the choice of wavelength of light 34, and the sensitivity of system 30. In the illustrated example, inelastic scattering 42 is sensed in three wavelength bands, to wit, a green band (centered at or near 515 nanometers), a yellow band (centered at or near 570 nanometers), and a red band (centered at or near 680 nanometers). The construction and operations of such FILLS sensors is known in the art and is described, for example, by Strand et al. in "Laser Line Scan Fluorescence and Multi-Spectral Imaging of Coral Reef Environments," SPIE Vol. 2963, pp. 790–795, 1996.

The light sensed at each of the elastic scattering and various inelastic scattering wavelengths is passed to an image processor 36 that performs a series of novel processing steps (i.e., steps 104–120) in order to automatically generate an isolated image of manmade objects 20 that can be output to a display 38 (or other output device such as a printer). More specifically, at step 104, elastic scattered light 40 and inelastic scattered light 42 at the selected fluorescence wavelengths generated in image area 10 is used to form corresponding images for purpose of further processing. That is, the images formed at step 104 need not be displayed but otherwise have all the attributes of a displayable image where individual elements or pixels thereof have an intensity value associated therewith.

Each of the images formed at step 104 is further processed at step 106 to generate a corresponding number of what are known as local standard deviation (LSD) images. Briefly, as is known in the art, an LSD image is obtained by computing a standard deviation (of pixel intensities) for an M×N pixel area of an image centered on each pixel of the image. Details of LSD image computation are described by, for example, A. J. Nevis in "Adoptive Background Equalization and Image Processing Applications for Laser Line Scan Data," SPIE Vol. 3710, pp. 1260–1271, 1999.

The LSD images from step 106 are next processed at steps 108 and 110 to generate a binary image mask that delineates between inelastic scattering 42 associated with sediment 24 and the combination of elastic scattering 40 associated with manmade objects 20 and inelastic scattering 42 associated with coral 22. These steps exploit the fact the sediment 24 (or sediment-like regions of image area 10) are characterized by small local variations in the images formed at step 104 while coral 22 is characterized by larger local variations. Thus, the LSD images can be used to differentiate between coral 22 and sediment 24 in image area 10. Specifically, step 108 compares each (pixel) element of each LSD image to a threshold criteria that is a statistical parameter associated with the particular LSD image.

In the illustrated example, the statistical parameter calculated for each LSD image is equal to one-half a standard deviation above the LSD image's mean value, and the threshold criteria is met when the value being compared is less than this statistical parameter. However, other statistical parameters could be used or experimented with to suit a particular application.

Each (pixel) element satisfying the threshold criteria is assigned one binary state (i.e., either a digital "1" or "0") while each (pixel) element not satisfying the threshold criteria is assigned the other or opposite binary state (i.e., "0" or "1"). That is, if a (pixel) element satisfying the threshold criteria is assigned a digital value of "1", those (pixel) elements not satisfying the threshold criteria are assigned a digital value of "0". Conversely, if a (pixel) element satisfying the threshold criteria is assigned a digital value of "0", those (pixel) elements not satisfying the threshold criteria are assigned a digital value of "1". Either way, the background or sediment-like regions will have the same binary value.

The resulting binary images are logically combined at step 110 to generate a composite binary image mask that delineates between most of coral 22 (as well as some of manmade objects 20) from sediment 24. For example, if the "background-like" pixels are assigned a digital value of "1", than the logical "AND" operator is used. However, if the "background-like" pixels are assigned a digital value of "0", than the logical "OR" operator is used.

The goal of steps 112–116 is to locate "holes" in the fluorescence-based images formed at step 104 where these holes are indicative of manmade objects 20. Specifically, step 112 generates a statistical threshold criteria for each of the fluorescence-based images. This criteria is based on just the portions of each of the fluorescence-based images identified by those portions of the composite binary image mask from step 110 indicative of background or sediment-like regions. That is, the portions of the composite binary image mask identified as background in image area 10 form a template used to identify corresponding portions of each of the fluorescence-based images. Then, only the intensity values for the (pixel) elements of each fluorescence-based image identified by the (composite binary image mask) template are used to calculate a mean and standard deviation for each of the fluorescence-based images. In the illustrated example, empirical data indicated that a suitable statistical threshold criteria was 1.5 standard deviations below the mean value of the identified portions of the fluorescence-based images. Once again, as in step 108, the particular statistical threshold criteria is not a limitation of the method of the present invention.

Next, at step 114, each (pixel) element of the fluorescence-based images from step 104 is compared to its corresponding statistical threshold criteria generated at step 112. "Holes" in these fluorescence-based images indicative of manmade objects 20 are identified by those (pixel) elements having intensity values that are less than the statistical threshold criteria. Accordingly, (pixel) elements having values less than the statistical threshold criteria are assigned to one binary state (i.e., "1" or "0") while all other (pixel) elements are assigned to the other binary state (i.e., "0" or "1").

The resulting binary images from step 114 are then logically combined at step 116 to form a binary image that masks out (e.g., the elements have a digital value of "0") everything in image area 10 except for manmade objects 20, the (pixel) elements of which have a digital value of "1". Note that the logical "AND" operator is used if (pixel) elements indicative of manmade objects 20 are assigned a digital value of "1" whereas the logical "OR" operator is used if (pixel) elements indicative of manmade objects 20 are assigned a digital value of "0". The location of manmade objects 20 appear on display 38 as either white objects (e.g., digital value of "1") on a monochrome (black) background (e.g., digital value of "0"), or monochrome (black) objects on a white background. Obviously, two different colors could also be used without departing from the scope of the present invention.

Although not required, the binary manmade object image mask can be "cleaned up" prior to being displayed at display step 120. More specifically, step 118 applies standard image-processing mathematical morphology operations to the output from step 116. Such operations can include, but are not limited to, a sequence in which a first dilation is followed by an opening and then a second dilation.

The advantages of the present invention are numerous. Manmade objects can be automatically isolated in a cluttered underwater environment such as littoral coral reef environments. The occurrence of both missed contacts and false positives is greatly reduced. Extensive training of human observers is not required. Thus, the present invention is a vast improvement over traditional acoustic, optical and human-observation mine hunting techniques.

Although the invention has been described relative to a specific embodiment thereof, there are numerous variations and modifications that will be readily apparent to those skilled in the art in light of the above teachings. For example, the wavelength of the illuminating light 34 could be different as could the wavelengths of inelastically scattered light 42 that are sensed by system 30. Further, the number of sensed fluorescence wavelengths could be more or less than the three used in the illustrated example. Additionally, sensor 32 could be other than a FILLS sensor. It could be, for example, a Streak Tube Imaging Lidar (STIL) or other lidar capable of fluorescence imagery. It is therefore to be understood that, within the scope of the appended claims, the invention may be practiced other than as specifically described.

What is claimed as new and desired to be secured by Letters Patent of the United States is:

1. A method of generating an isolated image of manmade objects residing in an underwater environment, comprising the steps of:

illuminating an image area underwater with light of a wavelength selected to generate elastic scattering of said light when incident on manmade objects and on naturally-occurring environmental features, and to generate fluorescence substantially only when incident on said naturally-occurring environmental features;

sensing said elastic scattering of said light from said image area at said wavelength;

forming an image of said image area using said elastic scattering of said light;

sensing light indicative of said fluorescence at a plurality of fluorescence wavelengths;

forming a fluorescence-based image of said image area at each of said plurality of fluorescence wavelengths wherein a plurality of fluorescence-based images are generated;

forming a local standard deviation (LSD) image of said image area based on each of said image and said plurality of fluorescence-based images wherein a plurality of LSD images are generated;

comparing each element of each of said plurality of LSD images to a threshold criteria to generate a corresponding plurality of first binary images, each of said plurality of first binary images defined by elements at one of a first image state and a second image state as determined by said step of comparing, wherein portions of each of said plurality of first binary images at said first image state are indicative of said manmade objects and said naturally-occurring environmental features, and wherein portions of each of said plurality of first binary images at said second image state are indicative of background in said image area that is neither said manmade objects or said naturally-occurring environmental features;

logically combining said plurality of first binary images to generate a composite image mask, wherein portions of said composite image mask indicative of said background have the same binary value;

generating a statistical threshold criteria for each of said plurality of fluorescence-based images using only portions thereof identified by said portions of said composite image mask;

comparing each element of each of said plurality of fluorescence-based images to said statistical threshold criteria corresponding thereto to generate a corresponding plurality of second binary images, each of said plurality of second binary images defined by elements at one of a first image state and a second image state as determined by said step of comparing, wherein only portions of each of said plurality of second binary images at said first image state are indicative of said manmade objects; and logically combining at least two of said plurality of second binary images to generate a binary manmade object image mask, wherein first portions of said binary manmade object image mask indicative of said manmade objects have the same binary value while second portions of said manmade object image mask not indicative of said manmade objects have a different binary value than said first portions.

2. A method according to claim 1 wherein said wavelength selected to generate elastic scattering in said step of illuminating is approximately 488 nanometers.

3. A method according to claim 2 wherein said plurality of fluorescence wavelengths includes wavelengths of approximately 515 nanometers, 570 nanometers and 680 nanometers.

4. A method according to claim 1 wherein said threshold criteria is unique for each of said plurality of LSD images and is based on a statistical parameter correspondingly associated with each of said plurality of LSD images.

5. A method according to claim 4 wherein each of said plurality of LSD images comprises a plurality of elements having standard deviation values, and wherein each said statistical parameter is based on a mean value of said standard deviation values for a corresponding one of said plurality of LSD images.

6. A method according to claim 5 wherein each said statistical parameter is approximately one-half a standard deviation above said mean value associated with said corresponding one of said plurality of LSD images.

7. A method according to claim 1 wherein said portions of each of said plurality of fluorescence-based images comprise a plurality of elements having intensity values assigned thereto, and wherein said statistical threshold criteria is based on a mean value of said intensity values.

8. A method according to claim 7 wherein said statistical threshold criteria is approximately 1.5 standard deviations below said mean value.

9. A method according to claim 1 further comprising the step of modifying said binary manmade object image mask by applying mathematical morphology operations thereto.

10. A method of generating an isolated image of manmade objects residing in an underwater environment, comprising the steps of:

illuminating an image area underwater with light of a wavelength of approximately 488 nanometers;

sensing elastic scattering of said light from said image area;

forming an image of said image area using said elastic scattering of said light;

sensing light from said image area at a plurality of fluorescence wavelengths to include 515, 570 and 680 nanometers;

forming a fluorescence-based image of said image area at each of said plurality of fluorescence wavelengths wherein a plurality of fluorescence-based images are generated;

forming a local standard deviation (LSD) image of said image area based on each of said image and said plurality of fluorescence-based images wherein a plurality of LSD images are generated;

comparing each element of each of said plurality of LSD images to a threshold criteria to generate a corresponding plurality of first binary images, each of said plurality of first binary images defined by elements at one of a first image state and a second image state as determined by said step of comparing, wherein portions of each of said plurality of first binary images at said first image state are indicative of said manmade objects and said naturally-occurring environmental features, and wherein portions of each of said plurality of first binary images at said second image state are indicative of background in said image area that is neither said manmade objects or said naturally-occurring environmental features;

logically combining said plurality of first binary images to generate a composite image mask, wherein portions of said composite image mask indicative of said background have the same binary value;

generating a statistical threshold criteria for each of said plurality of fluorescence-based images using only portions thereof identified by said portions of said composite image mask;

comparing each element of each of said plurality of fluorescence-based images to said statistical threshold criteria corresponding thereto to generate a corresponding plurality of second binary images, each of said plurality or second binary images defined by elements at one of a first image state and a second image state as determined by said step of comparing, wherein only portions of each of said plurality of second binary images at said first image state are indicative of said manmade objects;

logically combining at least two of said plurality of second binary images to generate a binary manmade object image mask; and modifying said binary manmade object image mask by applying mathematical morphology operations thereto, wherein first portions of said binary manmade object image mask so-modified that are indicative of said manmade objects have the same binary value while second portions of said manmade object image mask so-modified that are not indicative of said manmade objects have a different binary value than said first portions.

11. A method according to claim 10 wherein said threshold criteria is unique for each of said plurality of LSD images and is based on a statistical parameter correspondingly associated with each of said plurality of LSD images.

12. A method according to claim 11 wherein each of said plurality of LSD images comprises a plurality of elements having standard deviation values, and wherein each said statistical parameter is based on a mean value of said standard deviation values for said corresponding one of said plurality of LSD images.

13. A method according to claim 12 wherein each said statistical parameter is approximately one-half a standard deviation above said mean value associated with said corresponding one of said plurality of LSD images.

14. A method according to claim 10 wherein said portions of each of said plurality of fluorescence-based images comprise a plurality of elements having intensity values assigned thereto, and wherein said statistical threshold criteria is based on a mean value of said intensity values.

15. A method according to claim 14 wherein said statistical threshold criteria is approximately 1.5 standard deviations below said mean value.

16. A method of generating an isolated image of manmade objects residing in an underwater environment, comprising the steps of:

- illuminating an image area underwater with light of a wavelength selected to generate elastic scattering of said light when incident on manmade objects, coral and sediment in said image area, and to generate fluorescence substantially only when incident on coral and sediment in said image area;
- sensing said elastic scattering of said light from said image area at said wavelength;
- forming an image of said image area using said elastic scattering of said light;
- sensing light at a plurality of fluorescence wavelengths;
- forming a fluorescence-based image of said image area at each of said plurality of fluorescence wavelengths wherein a plurality of fluorescence-based images are generated;
- processing said image and said plurality of fluorescence-based images to generate a first binary image defined by elements at one of a first image state and a second image state, wherein portions of said first binary image at said first image state are indicative of said sediment, and wherein portions of said first binary image at said second image state are indicative of said coral and said manmade objects;
- processing said plurality of fluorescence-based images using a statistical parameter associated with said portions of said first binary image at said first image state, wherein a corresponding plurality of second binary images are generated, each of said plurality of second binary images defined by elements at one of a first image state and a second image state, wherein only portions of each of said plurality of second binary images at one of said first image state and said second image state are indicative of said manmade objects; and
- logically combining at least two of said plurality of second binary images to generate a binary manmade object image mask, wherein first portions of said binary manmade object image mask indicative of said manmade objects have the same binary value while second portions of said manmade object image mask not indicative of said manmade objects have a different binary value than said first portions.

17. A method according to claim 16 further comprising the step of modifying said binary manmade object image mask by applying mathematical morphology operations thereto.

\* \* \* \* \*